(12) United States Patent
Weber et al.

(10) Patent No.: US 9,416,901 B2
(45) Date of Patent: Aug. 16, 2016

(54) ICE SKATE BLADE AND BLADE HEATING ARRANGEMENT

(75) Inventors: Tory Weber, Calgary (CA); Benoit Talbot, St. Malachie (CA); David Croteau, Saint-Etienne (CA); Stephan Lachevrotiere, St. Augustin (CA); Pierre Harvey, St. Ferreol (CA)

(73) Assignee: Scorched Ice Inc., Calgary, AB (CA)

( * ) Notice: Subject to any disclaimer, the term of this patent is extended or adjusted under 35 U.S.C. 154(b) by 824 days.

(21) Appl. No.: 12/669,952

(22) PCT Filed: Jul. 4, 2008

(86) PCT No.: PCT/CA2008/001216
§ 371 (c)(1),
(2), (4) Date: Jun. 11, 2010

(87) PCT Pub. No.: WO2009/012562
PCT Pub. Date: Jan. 29, 2009

(65) Prior Publication Data
US 2010/0253020 A1    Oct. 7, 2010

(30) Foreign Application Priority Data

Jul. 20, 2007  (CA) .................................... 2605934
Jul. 20, 2007  (CA) .................................... 2609371
Sep. 7, 2007   (CA) .................................... 2601259

(51) Int. Cl.
*A63C 1/30*      (2006.01)
*F16L 25/01*     (2006.01)

(52) U.S. Cl.
CPC ..................................... *F16L 25/01* (2013.01)

(58) Field of Classification Search
USPC ............ 280/11.12, 11.17, 11.18, 11.3, 11.33, 280/11.34
See application file for complete search history.

(56) References Cited

U.S. PATENT DOCUMENTS

| | | |
|---|---|---|
| 2,692,326 A | 10/1954 | Crowell |
| 3,119,921 A | 1/1964 | Czaja |
| 3,866,927 A | 2/1975 | Tvengsberg |
| 3,906,185 A | 9/1975 | Gross et al. |
| 3,913,312 A | 10/1975 | Numabe |
| 3,936,755 A | 2/1976 | Sheng |
| 4,223,900 A * | 9/1980 | Olivieri ..................... 280/11.12 |
| 4,251,086 A * | 2/1981 | Woolley .................... 280/11.12 |
| 4,314,708 A * | 2/1982 | Zuuring .................... 280/11.18 |
| 4,549,742 A * | 10/1985 | Husak et al. .............. 280/11.18 |
| 4,744,574 A * | 5/1988 | Soo ........................... 280/11.18 |
| 4,761,420 A | 8/1988 | Genain |
| 5,088,749 A * | 2/1992 | Olivieri ..................... 280/11.18 |
| 5,248,156 A | 9/1993 | Cann |
| 5,441,305 A | 8/1995 | Tabar |
| 5,484,148 A * | 1/1996 | Olivieri ..................... 280/11.18 |
| 5,769,434 A * | 6/1998 | Wurthner .................. 280/11.18 |

(Continued)

*Primary Examiner* — Katy M Ebner
(74) *Attorney, Agent, or Firm* — Adrian D. Battison; Ade & Company Inc

(57) ABSTRACT

An ice skate assembly for attachment to a boot has a skate blade and a blade heating arrangement mounted within a blade support. The blade is heated by a row of field-effect transistors or by a resistance heating wire carried on the blade at a circuit board encapsulated on the top edge of the blade in an over-molded plastic strip which engages into a slot in the support as a wedged fit. The blade is attached by an inclined wedge member a screw for pulling the blade longitudinally of the blade and to draw the inclined wedge member into its receptacle. The battery pack is carried in the rear tower which is sealed against moisture penetration and includes two proximity switches for actuation.

9 Claims, 14 Drawing Sheets

(56) References Cited

U.S. PATENT DOCUMENTS

| | | | |
|---|---|---|---|
| 5,988,683 A * | 11/1999 | Venier et al. | 280/841 |
| 6,109,622 A * | 8/2000 | Reynolds | 280/11.17 |
| 6,485,033 B2 * | 11/2002 | Nicoletti et al. | 280/11.18 |
| 6,523,835 B1 * | 2/2003 | Lyden | 280/11.12 |
| 6,669,209 B2 | 12/2003 | Furzer | |
| 6,761,363 B2 * | 7/2004 | Fask et al. | 280/11.18 |
| 6,817,618 B2 | 11/2004 | Furzer | |
| 6,894,893 B2 | 5/2005 | Hidesawa | |
| 6,988,735 B2 | 1/2006 | Furzer | |
| 7,387,302 B2 * | 6/2008 | Goldsmith et al. | 280/11.12 |
| 7,673,884 B2 * | 3/2010 | Wuerthner | 280/11.18 |
| 2003/0107192 A1 | 6/2003 | Furzer et al. | |
| 2003/0234499 A1 * | 12/2003 | Rudolph | 280/11.17 |
| 2004/0140631 A1 * | 7/2004 | Goldsmith et al. | 280/11.12 |
| 2005/0029755 A1 * | 2/2005 | Fask et al. | 280/11.18 |
| 2005/0134010 A1 * | 6/2005 | Blankenburg et al. | 280/11.18 |
| 2008/0100008 A1 * | 5/2008 | Wan | 280/11.18 |
| 2008/0231007 A1 * | 9/2008 | Mayer et al. | 280/11.12 |
| 2010/0176564 A1 * | 7/2010 | Koyess et al. | 280/11.12 |

* cited by examiner

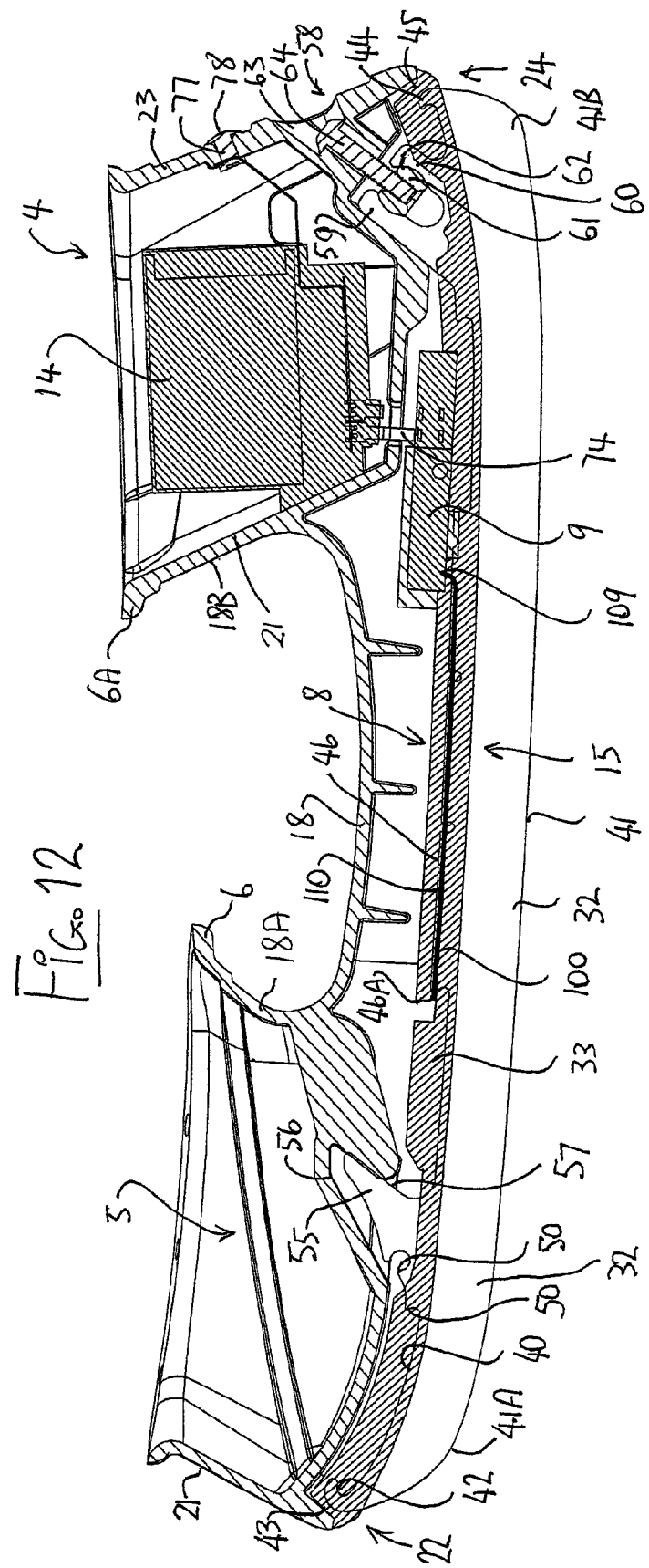

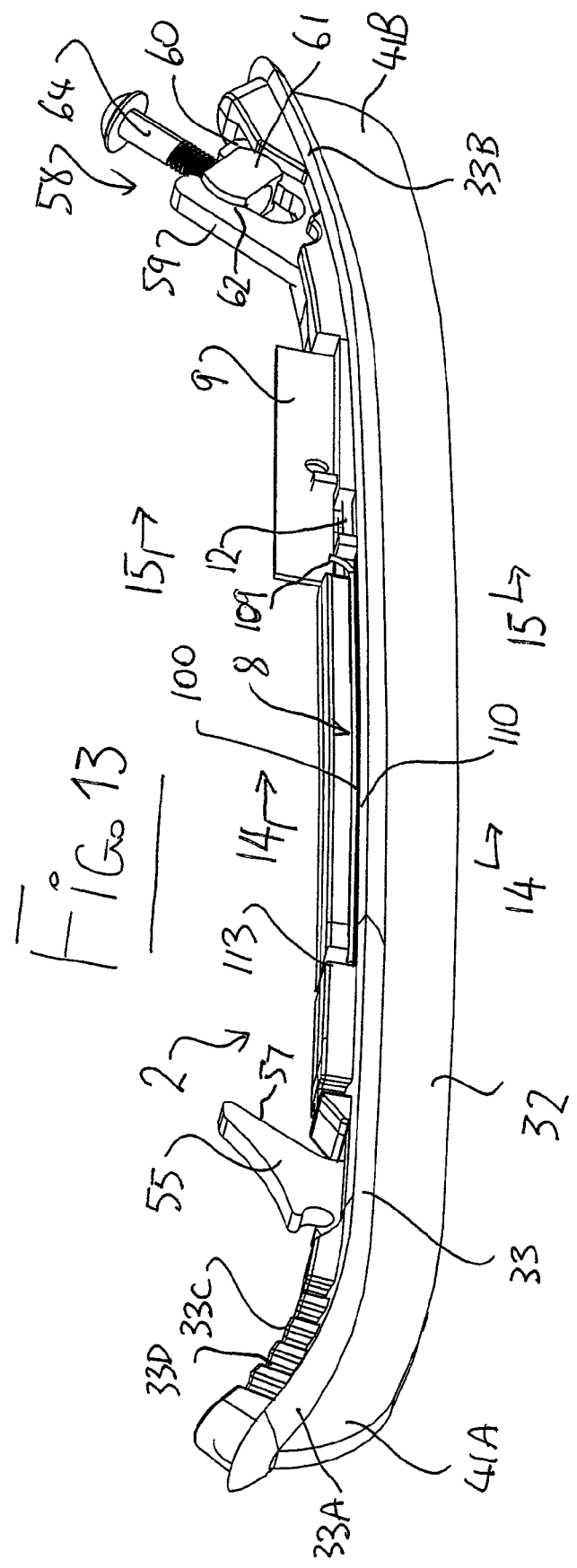

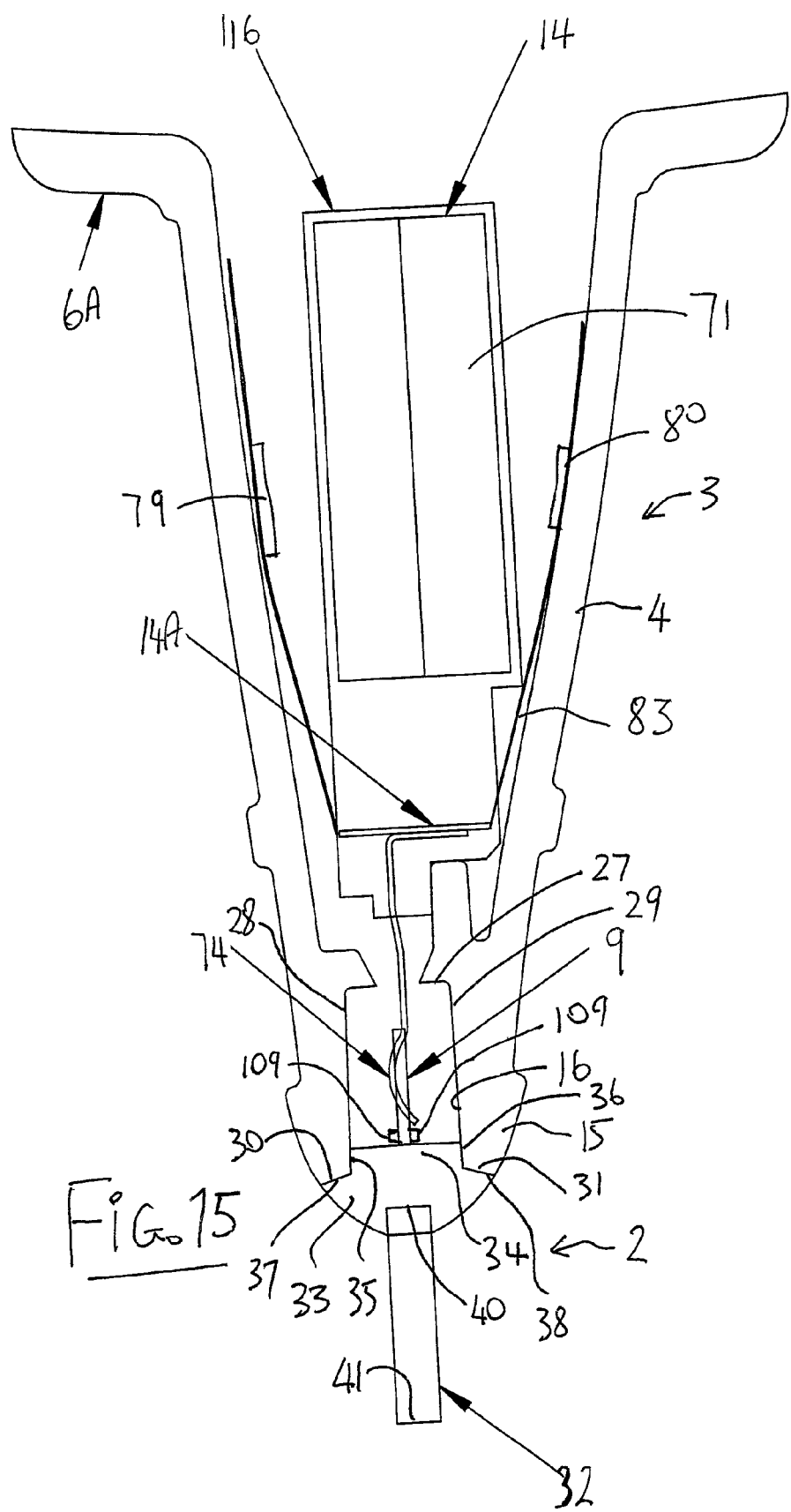

_(1)_

ICE SKATE BLADE AND BLADE HEATING ARRANGEMENT

The present invention relates to an ice skate blade and support for the blade which attaches the blade to a skate boot.

BACKGROUND OF THE INVENTION

Common ice skates used in skating have an elongate blade which is arranged to slide along the ice surface. Attempts to minimise the friction between the blade and the ice using heat are shown a number of US patents. The blade when of the heated type also must be mounted in an effective manner which takes into account the provision of the heating and control circuits which become part of the system. A number of prior patents show mounting systems.

U.S. Pat. No. 3,119,921 (Czaja) issued Nov. 2, 1962 discloses a resistant heating element attached along a top of the blade on a skate with a battery mounted in the open area above the blade underneath the connection of the blade to the boot.

U.S. Pat. No. 3,866,927 (Tvengsberg) issued February 18 discloses a similar arrangement.

U.S. Pat. No. 5,441,305 (Tabar) issued Aug. 15, 1995 discloses a heating system primarily for skis which appears to be speculative in nature and includes a number of different arrangements which could be used.

U.S. Pat. No. 6,669,209 issued Dec. 30, 2003, U.S. Pat. No. 6,817,618 issued Nov. 16, 2004 and U.S. Pat. No. 6,988,735 issued Jan. 24, 2006 all by Furzer and all assigned to the present assignee disclose various arrangements of heated skate blade.

U.S. Pat. No. 5,088,749 (Olivieri) issued Feb. 18, 1992 discloses a skate blade mounting system where a metal blade has hook portions along its top edge which are pulled tight onto the molded plastic base by a screw and lever arrangement.

U.S. Pat. No. 5,248,156 (Cann) issued Sep. 28, 1993 discloses a skate blade with a replaceable runner which is hooked at the font end and fastened by a screw at the rear.

U.S. Pat. No. 5,769,434 (Wurthner) issued Jul. 23, 1998 discloses a skate blade formed of a plastics material with a metal runner.

U.S. Pat. No. 6,523,835 (Lyden) issued Feb. 25, 2003 discloses a skate blade system where the blade can be manufactured from various composites and can be mounted using a hinging system.

US Published Application 2005/0029755 (Fask) published Feb. 10, 2005 discloses a skate blade including an injection molded steel runner which is screw fastened onto a plastic holder.

SUMMARY OF THE INVENTION

It is an object of the present invention to provide an ice skate assembly for attachment to a boot and particularly a mounting arrangement therefor.

According to a first aspect of the present invention there is provided a combination of a skate blade member and support therefor for attachment to a skate boot, comprising:

a skate blade member;

a support for the skate blade member having a bottom slot member defining a downwardly facing slot for receiving the blade member in fixed position along the slot, a front tower member and a rear tower member each extending upwardly from the bottom slot member to a top portion for attachment to the skate boot;

wherein the blade member comprises a rigid blade and an over-molding member of a plastics material along sides of the blade attached to the blade with a bottom edge of the blade exposed below the over-molding material;

the blade member being separate from and removable from the slot;

the over-molding material being molded to form a shape in transverse cross-section for engaging into the slot such that sides of the over-molding material engage sides of the slot to hold the blade member in place against side to side movement;

and a tightening arrangement for pulling the blade member into the slot.

According to a second aspect of the present invention there is provided a combination of a skate blade member and support therefor for attachment to a skate boot, comprising:

a skate blade member;

a support for the skate blade member having a bottom slot member defining a downwardly facing slot for receiving the blade member in fixed position along the slot, a front tower member and a rear tower member each extending upwardly from the bottom slot member to a top portion for attachment to the skate boot;

wherein the towers are hollow;

wherein the towers each include a surrounding top edge flange for fastening to the bottom surface of a skate boot;

and wherein each tower has a top edge flange with fastening holes for receiving fastening screws for fastening to the bottom surface of a skate boot and wherein holes are elongate to allow adjustment of the tower on the boot.

According to a third aspect of the present invention there is provided a combination of a skate blade member and support therefor for attachment to a skate boot, comprising:

a skate blade member;

a support for the skate blade member having a bottom slot member defining a downwardly facing slot for receiving the blade member in fixed position along the slot, a front tower member and a rear tower member each extending upwardly from the bottom slot member to a top portion for attachment to the skate boot;

the blade member being separate from and removable from the slot the blade member having a shape in transverse cross-section for engaging into the slot to hold the blade member in place against side to side movement;

and a tightening arrangement for pulling the blade member into the slot;

the tightening arrangement including a wedge member on the blade member;

the support including an inclined receptacle for the wedge member and a tensioning member to pull the blade member longitudinally along the slot to pull the wedge member into the receptacle in a wedging action;

wherein the wedge member is arranged adjacent the front of the blade member and the tensioning member is arranged to effect a pulling action rearwardly;

and wherein the tensioning member comprises a captured nut on the blade member adjacent a rear end of the blade member and a screw for insertion into a hole at the rear of the support for engaging into the captured nut to pull the blade member rearwardly.

According to a fourth aspect of the present invention there is provided a combination of a skate blade member and support therefor for attachment to a skate boot, comprising:

a skate blade member;

a support for the skate blade member having a bottom slot member defining a downwardly facing slot for receiving the blade member in fixed position along the slot, a front hollow tower member and a rear hollow tower member each extending upwardly from the bottom slot member to a top portion for attachment to the skate boot;

at least one heating element for applying heat to the blade;

a battery power source for supplying power to said at least one heating element;

the battery power source being mounted in one of the front and rear hollow tower members;

wherein the battery power source includes two proximity switches at spaced positions to require simultaneous actuation at the two different positions to prevent unintentional operation.

According to a fifth aspect of the present invention there is provided a combination of a skate blade member and support therefor for attachment to a skate boot, comprising:

a skate blade member;

a support for the skate blade member having a bottom slot member defining a downwardly facing slot for receiving the blade member in fixed position along the slot, a front hollow tower member and a rear hollow tower member each extending upwardly from the bottom slot member to a top portion for attachment to the skate boot;

at least one heating element for applying heat to the blade;

a battery power source for supplying power to said at least one heating element;

the battery power source being mounted in one of the front and rear hollow tower members;

wherein the battery power source includes a battery and a battery control circuit which are connected by an encapsulating material;

and wherein the encapsulating material is an over-molding having positive and negative terminals for the battery power source exposed at an outside location on the over-molding.

According to a sixth aspect of the present invention there is provided a combination of a skate blade member and support therefor for attachment to a skate boot, comprising:

a skate blade member;

a support for the skate blade member having a bottom slot member defining a downwardly facing slot for receiving the blade member in fixed position along the slot, a front hollow tower member and a rear hollow tower member each extending upwardly from the bottom slot member to a top portion for attachment to the skate boot;

at least one heating element for applying heat to the blade;

a battery power source for supplying power to said at least one heating element;

the battery power source being mounted in one of the front and rear hollow tower members;

wherein at least one heating element comprises a heating strip along a top edge of the blade member.

According to a seventh aspect of the present invention there is provided a combination of a skate blade member and support therefor for attachment to a skate boot, comprising:

a skate blade member;

a support for the skate blade member having a bottom slot member defining a downwardly facing slot for receiving the blade member in fixed position along the slot, a front hollow tower member and a rear hollow tower member each extending upwardly from the bottom slot member to a top portion for attachment to the skate boot;

at least one heating element for applying heat to the blade;

a battery power source for supplying power to said at least one heating element;

the battery power source being mounted in one of the front and rear hollow tower members;

and at least said one of the front and rear hollow tower members being between the bottom slot member and the top portion closed and free from perforations to prevent penetration of moisture to the battery power source.

According to a eighth aspect of the present invention there is provided a combination of a skate blade member and support therefor for attachment to a skate boot comprising:

a skate blade member;

a support for the skate blade member for attachment of the skate blade member to a skate boot;

a resistance heating member extending along a surface of the skate blade member for applying heat to the skate blade member;

a battery power source carried on the support for supplying current to the resistance heating member;

the resistance heating member comprising an elongate electrically conductive wire of constant cross-section along which the current from the battery power source is conducted with a layer of electrically insulating material applied onto an outside peripheral surface of the wire, the wire extending in a substantially straight path along the surface of the skate blade member and the wire being against the surface so that the layer is held in direct contact with the surface to transfer heat thereto.

According to a ninth aspect of the present invention there is provided a combination of a skate blade member and support therefor for attachment to a skate boot comprising:

a skate blade member;

a support for the skate blade member for attachment of the skate blade member to a skate boot;

a resistance heating member extending along a surface of the skate blade member for applying heat to the skate blade member;

a battery power source carried on the support for supplying current to the resistance heating member;

wherein the resistance heating member has one side in contact with the skate blade member and all other sides surrounded by a heat insulating plastics material.

According to a tenth aspect of the present invention there is provided a combination of a skate blade member and support therefor for attachment to a skate boot comprising:

a skate blade member;

a support for the skate blade member for attachment of the skate blade member to a skate boot;

a resistance heating member extending along a surface of the skate blade member for applying heat to the skate blade member;

a battery power source carried on the support for supplying current to the resistance heating member;

wherein the skate blade member includes a metal skate blade with an over-molding of plastics material;

wherein the plastics material is shaped to form a groove with a base of the groove at the surface of the metal skate blade;

and wherein the resistance heating member is received in the groove.

According to a eleventh aspect of the present invention there is provided a combination of a skate blade member and support therefor for attachment to a skate boot comprising:

a skate blade member;

a support for the skate blade member for attachment of the skate blade member to a skate boot;

a resistance heating member extending along a surface of the skate blade member for applying heat to the skate blade member;

a battery power source carried on the support for supplying current to the resistance heating member;

wherein the resistance heating member is compressed against a surface of the skate blade member by a deformable bead of a resilient material.

BRIEF DESCRIPTION OF THE DRAWINGS

In the accompanying drawings, which illustrate an exemplary embodiment of the present invention:

FIG. 11 is cross sectional view along the lines 11-11 of FIG. 4.

FIG. 12 is a longitudinal cross sectional of a further embodiment of the arrangement generally shown in FIG. 1 which uses a resistance heating element.

FIG. 13 is an isometric view from one side of the skate blade member of the embodiment of FIG. 12.

FIG. 15 is cross sectional view along the lines 14-14 of FIG. 13.

DETAILED DESCRIPTION

Figure 1:
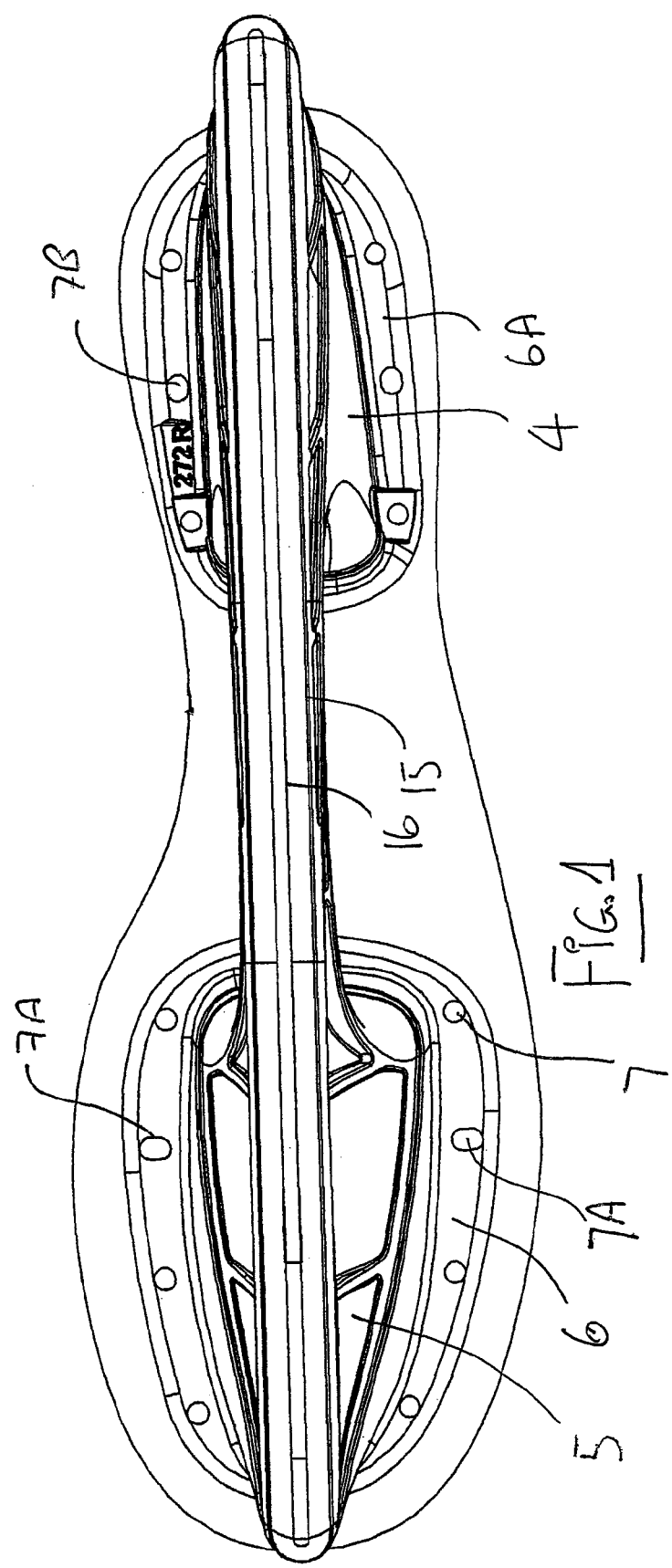
FIG. 1 is a bottom plan view of a heated skate blade according to the present invention showing the blade and mounting for attachment to a skate boot which is shown in outline only for convenience of illustration.
Figure 2:
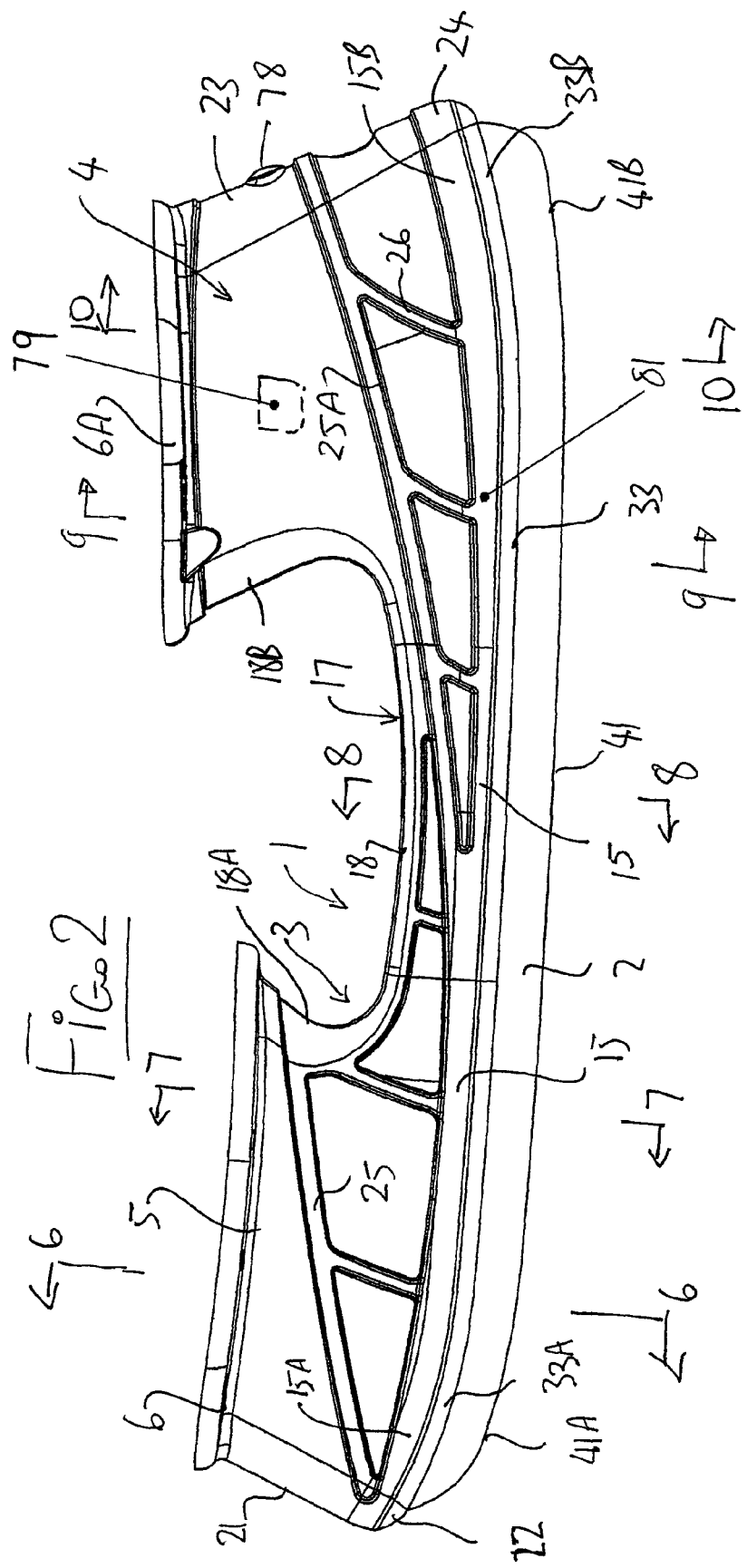
FIG. 2 is a side elevational view of the embodiment of FIG. 1 with the boot omitted for convenience of illustration.

Referring to the accompanying drawings FIGS. 1 and 2, there is illustrated an ice skate blade assembly 1. The skate blade assembly is of the conventional ice skate type having a blade 2 and a holder 3 to support the blade. The holder has a hollow heel tower 4 and a hollow toe tower 5 each having a top flange 6, 6A around the peripheral edge of the tower which fastens to the skate boot by a series of holes 7 around the flange.

The skate blade assembly 1 is generally fastened through the sole plate flange holes 7 through matching holes in the sole of an ice skate boot (not shown) with mechanical fasteners (not shown). The heel 4 and the toe 5 of the skate blade holder 3 generally are hollow.

A heating arrangement 8 is arranged to heat the skate blade 2 such that the heat reduces the coefficient of friction of the blade 2 on an ice surface. The heating arrangement 8 has a heat control circuit board 9 mounted on the top edge of the blade and a battery 14 and battery control circuit board 14A in the hollow heel tower 4 of the holder 3.

A number of different possibilities for generating heat for the blade can be used. In one option, the heating system uses a series of transistors 12A, 12B, 12C and 12D best shown in FIG. 4 arranged at spaced portions along the top edge of the blade within the central area between the two mounting towers 4 and 5. Each transistor is mounted on an upwardly projecting portion of the metal blade so as to communicate heat thereto. The circuit has a thermistor 12 which controls the temperature of the blade by controlling gate voltage to the transistors. In practice the blade temperature is maintained just above freezing at a temperature of the order of 2 to 10 degrees Celsius and preferably of the order of 4 to 6 degrees. In many cases where the player is off the ice for a short break as in regular shifts in a hockey game, the temperature of the box or other rest area is often sufficiently high that the heater is turned off during the break period off the ice and only turns back on when the player or skater is back on the ice for a sufficient period to cool the blade down to the temperature below the set temperature. This ensures that the heater is used only when required on the ice and the battery power is not wasted when the player is off the ice. This avoids the use of motion sensors or other timing devices to control the heat application.

By taking the transistors 12 into the linear region of operation, a high efficiency heat source is produced. The power source is a rechargeable battery 14 and is regulated for circuit operation and used to supply the transistors 12, which are preferably a field effect transistor (FET) or a power MOSFET. However conventional bipolar junction type transistor can also be used.

The holder 3 defines an elongate bottom section 15 which extends along the full length of the holder and defines along a center thereof a slot 16 for receiving the blade. The elongate member 15 is connected to the hollow towers 4 and 5 so that the towers converge downwardly and inwardly from the top flange 6, 6A toward the bottom elongate member 15. At the bottom member 15, the moulded body forming the holder is solid and this solid structure extends upwardly into the structure of the holder until the width expands sufficiently to allow the structure to be formed into the hollow towers 4 and 5 while providing sufficient strength within the holder body from the moulded plastics material.

Between the hollow towers, the holder includes a U-shaped area 17 defining a top edge 18 which is the top edge of the solid part of the body on which the bottom member 15 is formed. The top surface 18 curves upwardly at the forward end to form a wall 18A which is the rear wall of the front tower 5. Similarly the top 18 at its rear curves upwardly to form a upward and forwardly extending portion 18B which forms the front wall of the rear tower 4. The front tower 5 thus has a rear end at the rear end of the flange 6 which overlies the surface 18 and symmetrically a forward end of the flange 6A of the tower 4 also overlies the surface 18.

The front tower 5 has a front wall 21 which extends downwardly to a forward end 22 of the member 15. The rear tower 4 has a rear wall 23 which extends downwardly to a rear end 24 of the member 15. The wall extending upwardly from the member 15 to the base of the towers includes side ribs 25 which extend upwardly and rearwardly as indicated at 25 and 25A together with downwardly extending ribs 26 which connect from the inclined ribs 25 and 25A to the bottom end 15 to provide an attractive appearance.

As best shown in the cross sectional views 6 through 10, the member 15 defines a slot 16 in its bottom surface with the slot 16 extending upwardly to an upper end 27 and defining two side walls 28 and 29 of the slot. The slot extends only partly across the width of the member 15 so that two shoulders 30 and 31 are formed at the bottom of the member 15 on either side of the slot 16. This slot provides a receptacle for the blade so that the blade may be inserted into this slot and pulled up into the slot to be held in fixed position on the bottom of the member 15 and held against side to side movement by engagement between the blade and the slot.

The blade 2 includes a steel blade portion 32 and an over-molded portion 33 of a plastics material. The over-moulded portion is moulded onto the sides of the steel blade 32 and across the top edge of the steel blade 32 so as to form a structural member rigidly and permanently attached to the steel blade and extending out to each side of the steel blade. Thus as shown for example in FIG. 7, the steel blade 32 engages into the over-molded plastics portion 33 so that it is held in place within that plastics portion. The plastics portion 33 includes a projecting element 34 with sides 35 and 36 which engage into the slot 16. The over-molded portion 33 includes top shoulders 37 and 38 which engage against the shoulders 30 and 31 of the bottom surface of the member 15.

Figure 3:
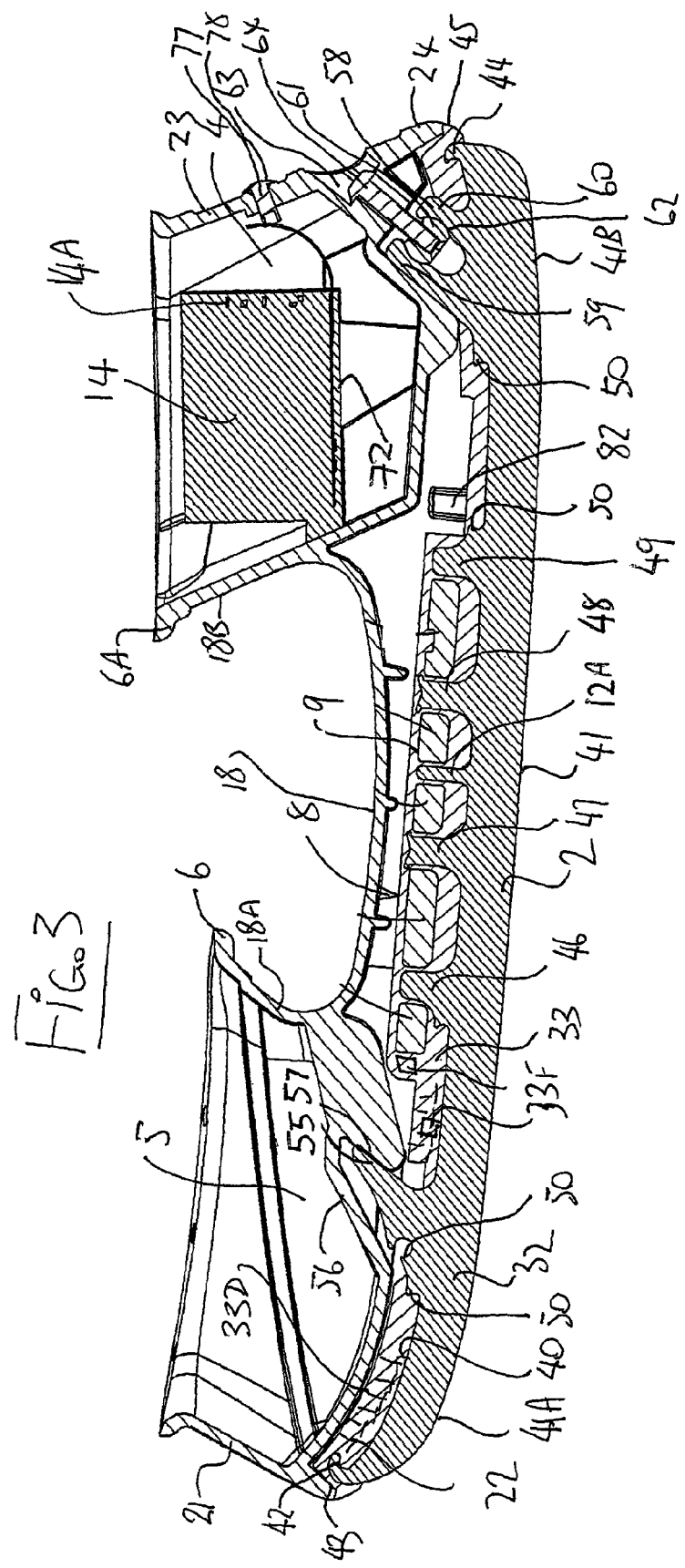
FIG. 3 is a longitudinal cross sectional of the embodiment of FIG. 1.

As best shown in FIG. 3, the steel blade 32 includes a top edge 40 which has a complex shape for engagement into the over-molded plastics portion 33. The steel blade 32 has a bottom edge 41 which forms the skate blade edge of a conventional shape with slightly upwardly curved front and rear portions 41A and 41B.

The complex upper edge 40 of the steel blade portion is shaped to define a series of hooks which engage into the over-molded plastics portion 33 to maintain permanent engagement therewith. Thus there is a front hook 42 at the forwardmost end of the steel blade and this is received just behind the front edge 43 of the over-molded plastics piece so that it is embedded in the plastics piece and acts to retain the blade within that plastics piece. Similarly there is a rear hook 44 which engages into the plastics piece just in front of the rear edge 45 of the over-molded plastics piece.

The steel blade further includes upwardly projecting elements 46, 47, 48 and 49 in the center section under the surface 18 which project into the area at the transistors 12A, 12B, 12C and 12D respectively to which they are attached. Some of these upwardly projecting members such as the members 47 and 48 have upper hooks which extend forwardly and rearwardly respectively for engaging into the plastics material to provide further engagement therewith. Further upwardly projecting portions 50 at spaced positions along the length of the blade also provide further engagement into the plastics material. The thermistor 12 is mounted on a central one of the projecting elements 12A.

Figure 7:
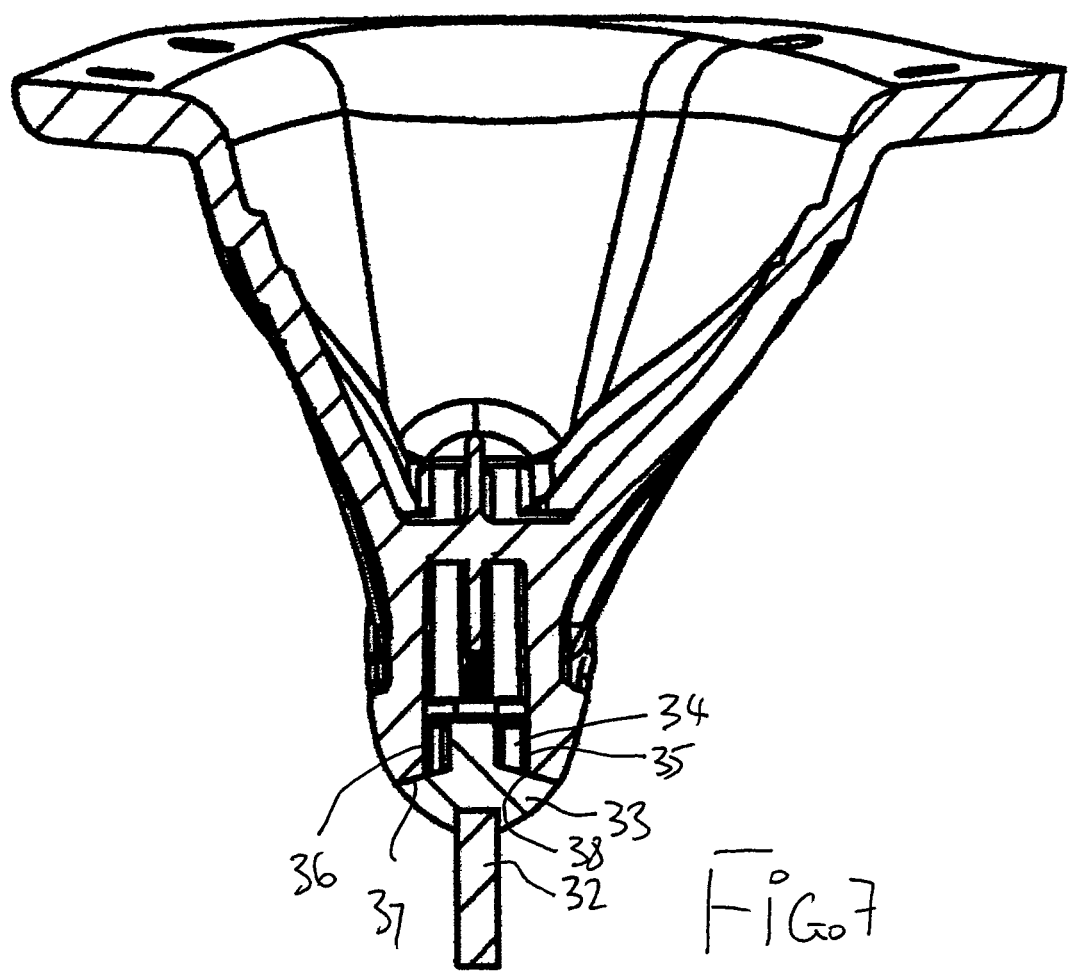
FIG. 7 is cross sectional view along the lines 7-7 of FIG. 2.
Figure 8:
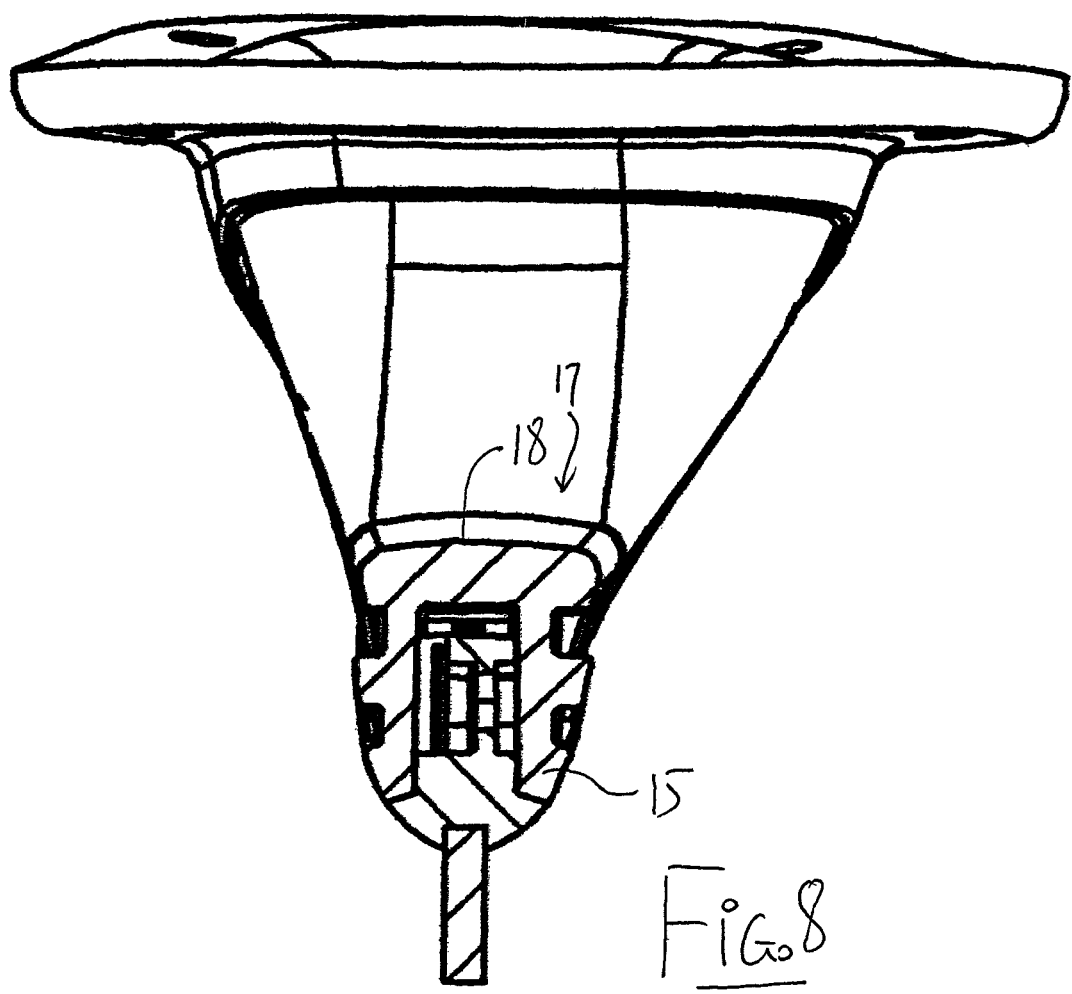
FIG. 8 is cross sectional view along the lines 8-8 of FIG. 2.
Figure 9:
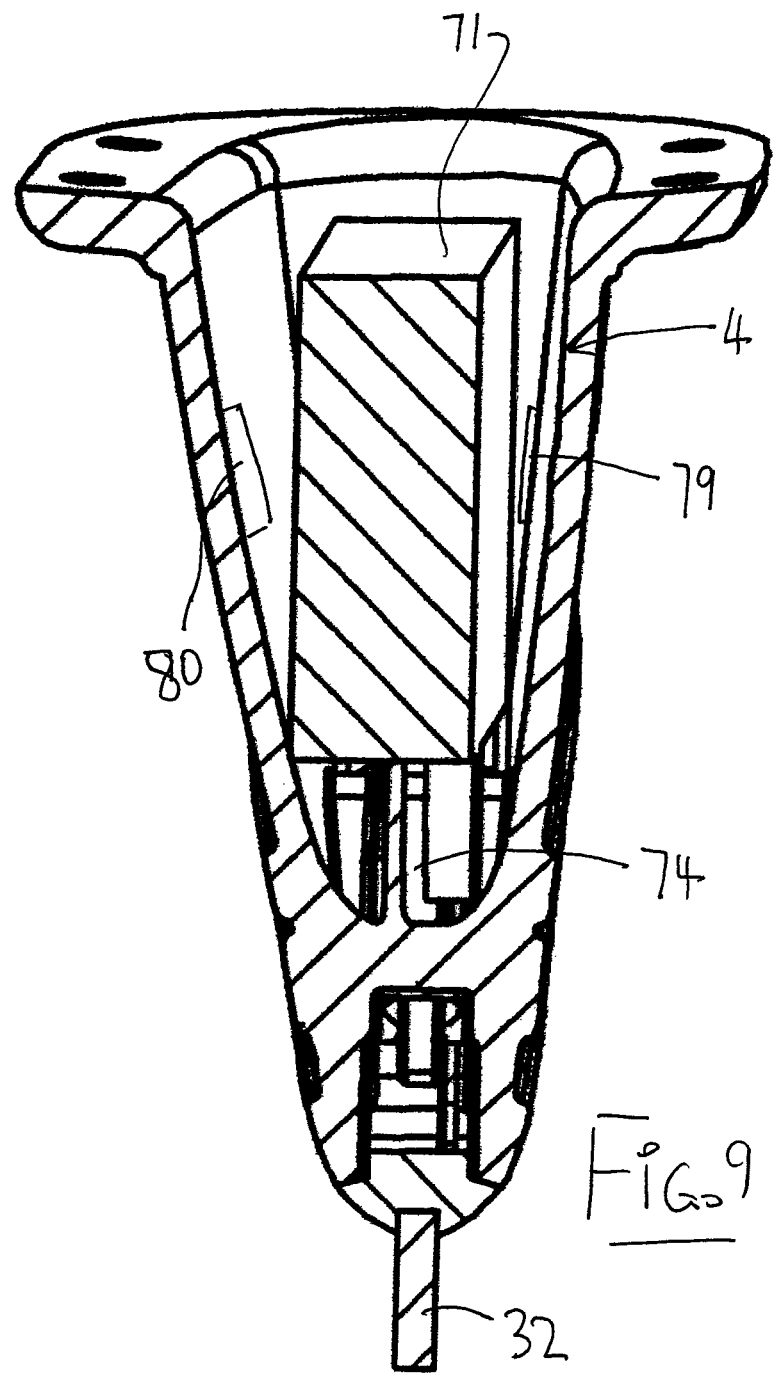
FIG. 9 is cross sectional view along the lines 9-9 of FIG. 2.
Figure 10:
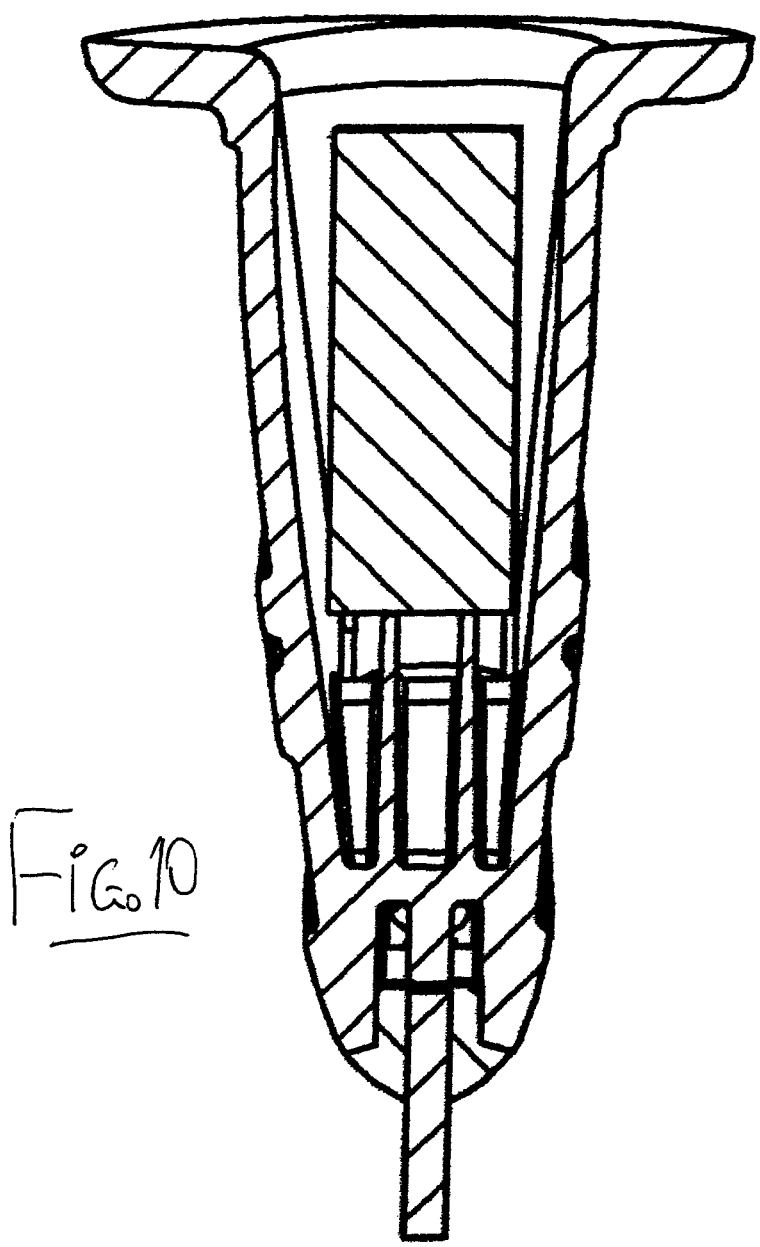
FIG. 10 is cross sectional view along the lines 10-10 of FIG. 2.

Thus at some locations as shown in FIG. 7 for example, the blade extends only a short distance into the plastics material. However at other locations along the blade, the blade extends through the moulded portion 33 to provide components projecting beyond the plastics portion.

Figure 4:
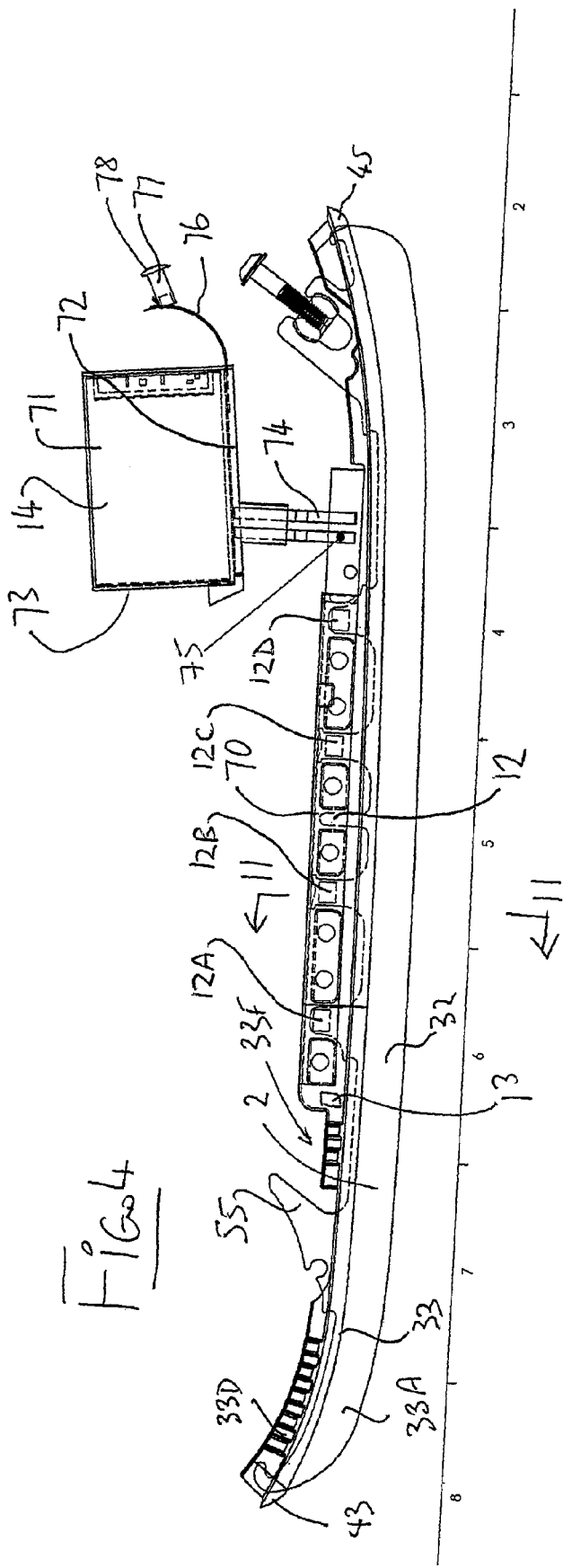
FIG. 4 is a side elevation view of the blade and battery power source of the embodiment of FIG. 1.

Thus as best shown in FIGS. 3 and 4, the steel blade includes a front engagement portion 55 which projects through the over-molded plastics portion 33 to provide an engagement hook member which extends into a receptacle 56 in the support. The hook member 55 has a rear surface 57 which extends upwardly and rearwardly so as to butt against a correspondingly inclined surface of the receptacle 56. It will be appreciated therefore that rearward pulling action on the blade 2 will cause the inclined surfaces to pull the blade upwardly into the slot 16 so as to force the shoulders of the blade against the shoulders at the base of the member 15.

The rearward pulling action on the blade is provided by a rear mounting member 58 of the blade. The rear mounting member 58 also projects upwardly through the over-molded plastics member 33 to provide an upwardly extending portion above that member. The rear mounting 58 includes two arms 59 and 60 between which is mounted a nut 61 received in a cylindrical bearing surface 62 allowing the nut to swivel about an axis at right angles to the axis of the nut. Thus the nut has a cylindrical outer surface which is contained within the cylindrical bearing surface 62 allowing this pivotal action to accommodate slight inaccuracies in the positioning of the blade relative to the holder. The rear wall 23 of the rear tower 4 has a recesses hole 63 for receiving a screw 64. The screw has a head which engages against a base of the recessed hole so that the screw can engage into the nut and by turning the screw the nut is pulled upwardly and rearwardly as the screw head butts against the shoulders on either side of the hole. Thus the turning of the screw 64 acts to pull the blade upwardly and rearwardly along the slot 16 so as to pull the rear part of the blade into the slot and so as to pull the blade rearwardly along the slot to force the front mounting portion 55 into the receptacle 56.

Thus the blade can be mounted on the holder by releasing the screw and by removing the projecting portion of the moulded plastics portion 33 from the slot by pulling the blade downwardly. The blade can be reinserted by simply inserting the blade approximately into its required position thus sliding the front member 55 into the receptacle 56 whereupon the screw and be inserted into the nut and the blade pulled up into place both longitudinally and upwardly.

Figure 6:
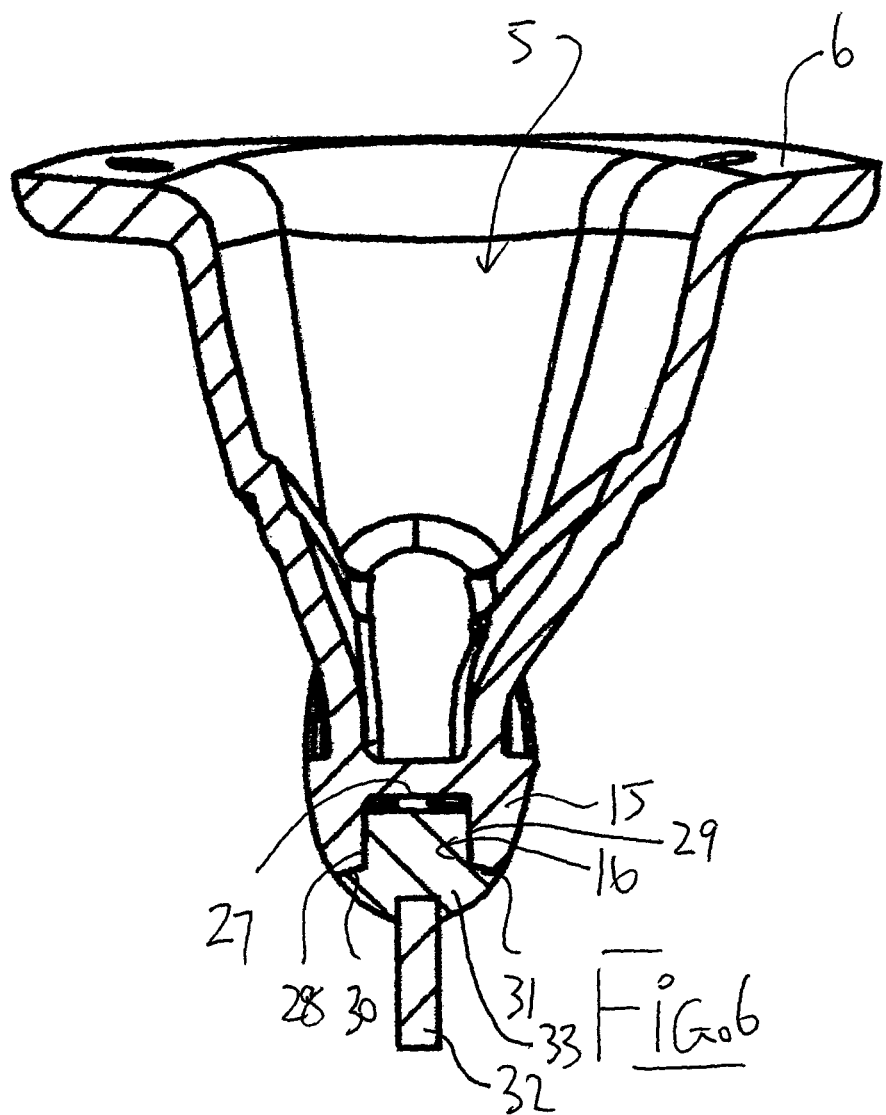
FIG. 6 is cross sectional view along the lines 6-6 of FIG. 2.

As shown for example in FIG. 6, the sides of the portion 33 within the slot are slightly tapered and the side walls of the slot itself are slightly tapered so as to provide a friction fit between the plastics parts as the blade is pulled upwardly. Thus the blade is pulled upwardly until the shoulders engage between the shoulders on the side of the plastics portion 33 and the shoulders at the base of the member 15. In this way a rigid mounting is provided by the engagement of the shoulders which prevent further upward movement and by the engagement of the tapered sides which prevent side to side slopping movement of the blade within the slot at the base of the member 15. In other words the top part of the moulded member 33 which engages into the sides of the slot provides a wedging action which resists side to side movement.

As best shown in FIG. 2, the bottom edge 41 of the blade curves upwardly and forwardly at the front end 41A and curves upwardly and rearwardly at the rear end 41B. The over-molded portion 33 similarly is curved upwardly at the forward end at 33A and is curved upwardly at the rearward end as indicated at 33B. Also following the same curvature, the bottom edge of the member 15 also curves upwardly and forwardly at the forward end indicated at 15A and upwardly and rearwardly at the rearward end indicated at 15B. In this way the blade and the over-molded portion 33 fit effectively into the slot 16 of the member 15 along the full length of the blade.

Figure 5:
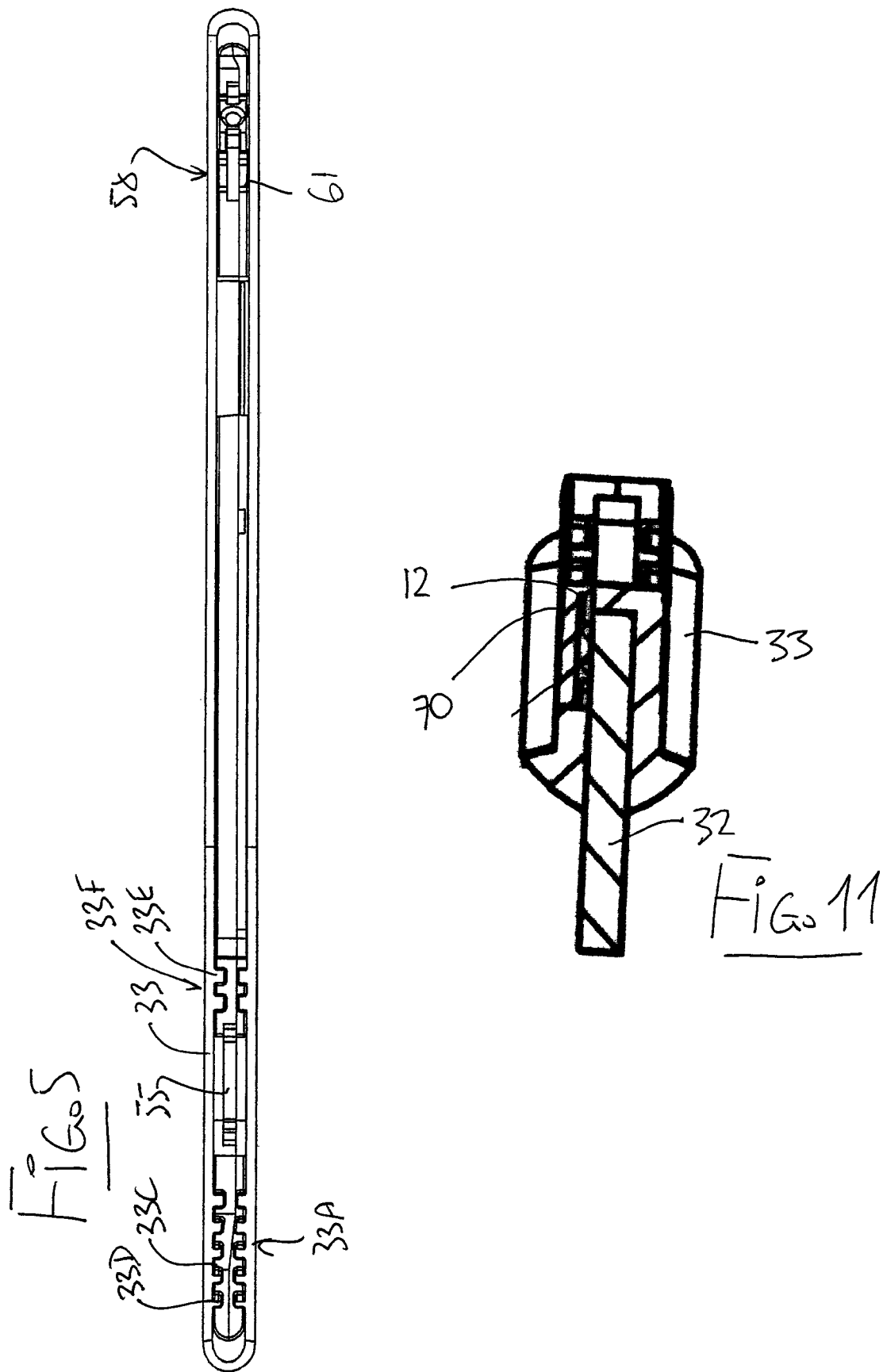
FIG. 5 is a top plan view the blade of FIG. 4.

As best shown in FIGS. 4 and 5, that part of the over-molded portion 33 which projects above the top edge of the blade 40 in the region of the front curved section 33A has the sides of the over-molded portion 33 castellated as indicated at 33C to provide a series of upstanding slots 33D in the sides. The slots 33D are provided in each side of the over-molded portion and extend down to a depth between the slots approximately equal to the width the blade. These slots are thus formed in the plastic part above the top edge of the blade and extend downwardly to the top edge of the blade. Further slots 33E forming a further castellated section 33F are provided behind the front mounting member 55. These castellated slots have been found to allow the mounting of the blade into the slot 16 in a manner which reduces vibration of the blade during vigorous stopping actions by the skater. They also add to the stiffness of the blade without adding too much weight.

Turning now to FIGS. 1 and 2, the towers 4 and 5 are arranged to extend upwardly to a position to engage the bottom of a conventional skate boot. It will be appreciated that in practice the heated skate blade arrangement of the present invention can be constructed as a separate item for attachment to boots manufactured by skate manufacturers so that the heated skate itself can be supplied to a number of different manufactures for use with their skate boots.

The tower 5 at the front is of reduced height relative to the tower 4 at the rear. Thus as is conventional the heel part of the boot is elevated above the toe part of the boot allowing the top flanges 6 and 6A to be attached directly to the bottom surface of the boot without the presence of a heel structure underneath the boot between the rear part of the boot and the top flange 6A.

The flange 6 surrounding the tower 5 is shaped so as to follow approximately the shape of the sole part of the boot and thus is slightly wider than the heel part of the boot at the flange 6A of the tower 4.

Each of the flanges includes a series of holes along the flanges on each side of the hollow tower and these holes are arranged to be fastened to the boot by rivets engaged through the flange from the underside and engaging into the receiving holes in the base of the boot.

Thus the sole has four receiving holes along each side for receiving the four holes of the flange 6. The rear part of the boot has three receiving holes on each side for receiving the rivets from the flange 6A.

The holes 7 in the front tower include some oblong holes or elongate holes 7A on the front flange 6 which are elongated in a direction side to side which are the third ones from the front of the tower 5. The holes 7 in the rear tower 4 include some oblong holes or elongate holes 7B on the rear flange 6A which are elongated in a direction front to rear direction which are the middle ones of tower 4). This allows adjustment of the position of the flange on the base of the boot so as to allow slight side to side and front to rear movement of the mount for the skate blade relative to the boot for improved alignment and ease of installation.

As best shown in FIG. 4, the heating element including the transistors 12 is in the form of a circuit board 70 which is mounted on a portion of the metal blade which is above the strip 33 so as to project upwardly into the slot 16 to a height above the shoulders 37 and 38. The circuit board extends along the center part of the blade located between the towers and underneath the surface 18 of FIG. 3. The circuit board 70 carries the transistors and also the temperature sensor 13. The circuit board is attached to the top part of the blade and is encapsulated within the over-moulding material above the strip 33 but within the uppermost surface of the moulding material so that the whole of the circuit board including the transistors and the other components of the circuit board are encapsulated within the moulded materials.

The battery power supply 14 includes a battery 71 and a battery control circuit board 72 located underneath the battery. A conventional battery protection circuit 14A is part of the battery since the batteries are sold with this little circuit incorporated in the battery enclosure. The battery control circuit 72 carries the components for controlling the supply of power from the battery including a low power indicator. The battery 71 and the circuit board 72 are contained within an encapsulating material as an enclosed separate item which can be inserted into the hollow tower as an integral element to be contained therein. The encapsulated battery power supply includes a pair of terminals 74 and 75 which are arranged to be connected to the blade for communication of current from the battery power supply to the heat control circuit carried on the blade.

As previously described, the blade itself can be removed from the mounting and thus the terminal 74 and 75 comprise terminals of the spring-finger type which engage onto fixed terminals on the blade simply by pressing the blade into the gap between the spring fingers of the terminal 74 and 75. Thus simple upward pressure of the blade onto the spring fingers at the required location causes the engagement between the terminals 74 and 75 and the requisite terminal on the blade. The battery power supply further includes a further terminal 76 in the form of a spring finger which extends from one end of the battery control circuit board for engagement with a stud or rivet 77 carried in the tower as best shown in FIG. 3 where the stud has a head 78 exposed at the rear wall 23 of the tower for engaging a charging system.

A charging system for the skate can therefore comprise components which have a first terminal for engagement with the blade 32 and a second terminal for engagement with the head 78 of the stud 77. This provides a connection to the batter power supply through the battery control circuit 72. As explained hereinafter, the transistors are connected to the metal blade so that current can flow from the metal blade 32 through the circuit of the heating control circuit board 70 to the terminal 75 and from the terminal 75 into the battery control circuit board 72 then to the battery 14 through a wire. The opposite connection of the charging power supply provides a connection through the stud 77 and the spring terminal 76 into the battery control circuit board 72 then to the battery 14 through a wire to provide the charging action.

The encapsulated circuit board 70 is thus contained within the slot 16 above the shoulders 37 and 38. The control circuit 70 is also contained below the wall 18 of the support so that it is fully enclosed both by its own encapsulation and by the surrounding structure of the support.

The battery power supply 14 is contained within the rear tower 4 above the elongate member 15 of the support and within the enclosed tower 4. The flange 6A is sealed to the underside of the skate boot with the battery power supply 14 in place. The sealing action can be provided by a gasket which overlies the flange 6A to provide an effective sealing action to prevent the penetration of moisture from the ice or from the environment into the rear tower 4 and thus into the area of the battery power supply. The rear tower 4 is fully enclosed and sealed without any openings for switches or connections since the tapered shoulder 33 seals with the base of the bottom support 15 when the screw 64 is tightened, apart from the stud 77 which is itself sealed into a hole in the rear wall 23 of the tower 4.

In order to avoid unnecessary openings into the hollow rear tower 4, the manually operable switch arrangement for activating the power supply is defined by a pair of proximity switches 79 and 80 mounted on the inside surface of the hollow rear tower 4 at sides of the tower at a position where the fingers and thumb of a user can reach around the rear wall 23 to squeeze together on respective side of the hollow rear tower to engage the areas of the tower at the proximity switches 79 and 80. The use of two proximity switches one on each side prevents inadvertent operation of the switch actuating the power supply by contact with an extraneous item such as a puck or other elements such as an opponent's stick. Thus the actuation of the switch occurs only in the event that both proximity switches are activated simultaneously and are touched in a particular predetermined pattern This the microprocessor may be programmed that the sensors must be touched for a predetermined minimum period of time or in a pattern like a computer mouse double click, that is they may be touched for at least predetermined minimum period of time but not more than a predetermined maximum period of time then released for at least predetermined minimum period of time but not more than a predetermined maximum period of time and then touched for at least a predetermined period of time which is an extremely unlikely event unless controlled by the user reaching to the proximity switches by a finger and thumb.

The use of the proximity switches avoids the penetration of the tower 4 so that there is no possibility for moisture penetration through openings at the switches. Proximity switches are commonly available and utilize the electrical changes effected by bringing the finger or thumb into close proximity with the electrical component on the inside surface.

An indicator light or LED for indicating the activation of the power supply is visible on the exterior of the tower 4 and is provided at the location 81 visible on both sides of the blade indicated on FIG. 2. The LED itself is shown in FIG. 3 as indicated at 82. At this location the plastics material forming the moulded skate support is made sufficiently thin that the illumination from the LED is visible on both sides through the plastics material without the necessity for a penetration of the LED itself through the plastics material. In the arrangement shown the LED is located at a position just above the top edge of the blade 32 in the area just above the elongate support 15 and just behind the central heated area of the skate blade. The LED may itself be located within the tower on one or other side adjacent the proximity switches 79 and 80.

Turning now to FIGS. 4 and 11, the circuit board 70 carrying the transistors 12 is located at the top edge of the blade 32 and enclosed by the over-moulding material 33. Since the transistor casing is made of an electrical conductive material, it is connected to the blade both electrically and thermally to allow the communication of current to the blade during the charging action as described before and to allow the communication of heat from the transistor to the top edge of the blade. The transistor is encapsulated by the moulding material 33 so that it is fully protected and maintained at the required location.

While the application of heat from the battery power supply to the top edge of the blade is preferably provided by the use of the transistors as previously described and as described in the prior patents of the present Assignees, alternative techniques for generating and applying the heat to the top edge of the blade can be used including commercially available resistant heating systems. In all cases the heating system is preferably contained or encapsulated within the over-molding material applied onto the top edge of the blade to provide the mounting as previously described. The heating system is thus protected by the over-molding plastics material and by the insertion of the heating system into the slot within the base of the support so that it is also therefore contained within that slot and protected from engagement with materials outside of the slot.

Turning now to FIGS. 12 to 15, an embodiment is shown where the above transistor heating systems are replaced by a resistance heating member 100 is formed by an elongate electrically conductive cylindrical wire 101 of constant cross-section along which the current from the battery power source is conducted with a layer 102 of electrically insulating material applied onto an outside peripheral surface of the wire. The wire is formed of a high resistance alloy so that the resistance is significantly greater than a comparable wire of copper so generate a significant heat output. Typical heating wires of this type are available from Isabellenhutte and are typically used for floor heating. In a suitable example the wire has a thickness of 32 gauge, 150 mm long, which in conjunction with a battery voltage of 7.4V typical can produce a heat output of 7.4 watts which is suitable for applying the required heat to the skate blade.

The wire 101 extends in a substantially straight path along the side surfaces of the skate blade member and the wire is held against the side surfaces 103 and 104 of the blade 32 so that the layer 101 is held in direct contact with the surface of the blade to transfer heat thereto.

The wire 101 includes a first portion 105 along the first side surface 103 of the skate blade member and a second portion 106 along a second opposed side surface 104 of the skate blade member, both being arranged close to the top edge 40 but spaced slightly downwardly from the top edge. The wire extends in a loop from a first electrical connection 108 on one side of the heating control circuit board 9 along the first side surface of the skate blade member, wraps around the end 46A of the raised section 46 of the blade 40 and returns along the second opposed side surface of the skate blade member to a second connection 109 on the other side of the heating control circuit board 9. The circuit board 9 is located directly at the end of the raised portion 46 at the top of the blade at a location where the top edge 40 of the blade 32 is recessed downwardly as shown in FIG. 15.

Figure 14:
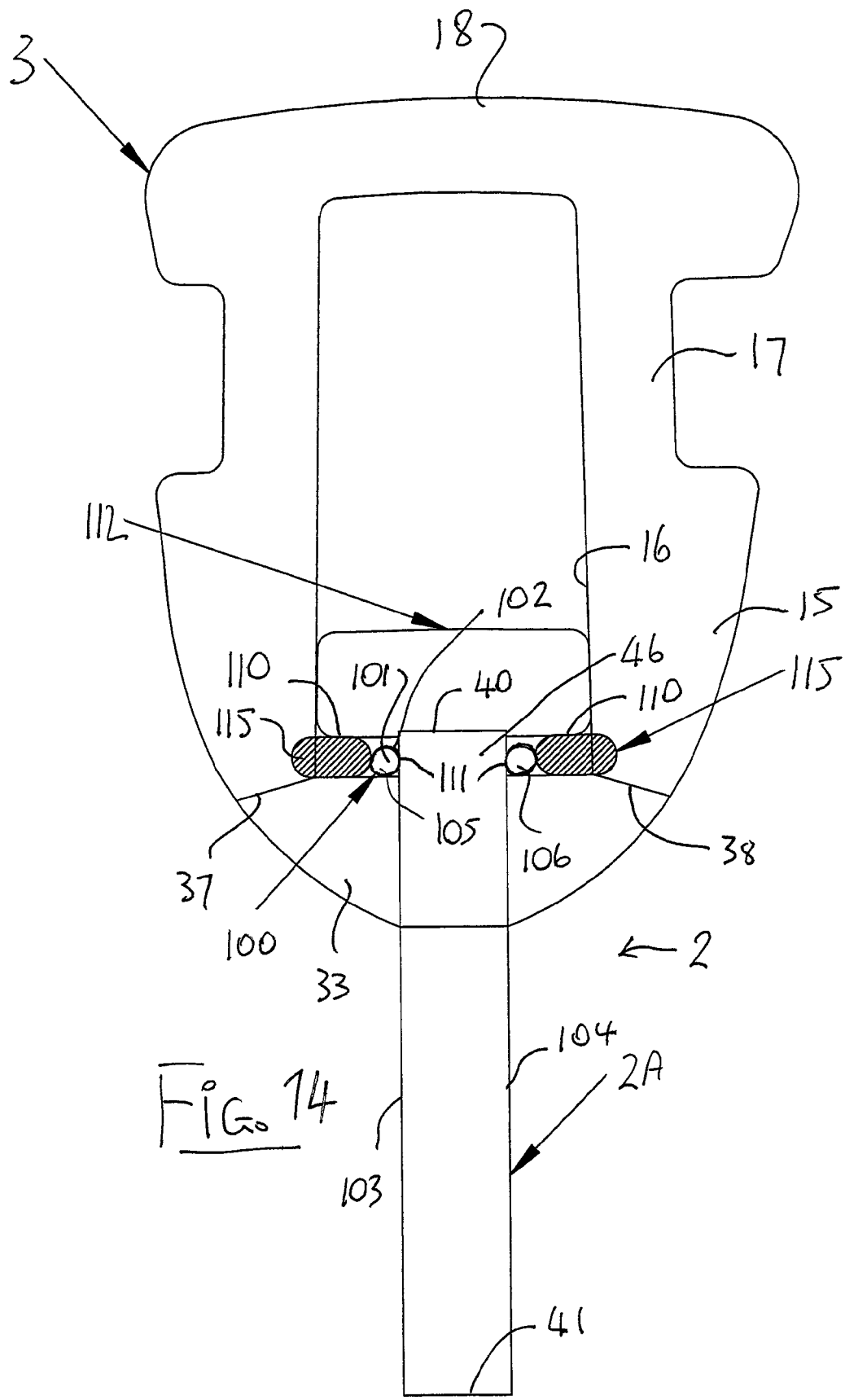
FIG. 14 is cross sectional view along the lines 14-14 of FIG. 13.

As best shown in FIGS. 13 and 14, the over-molding 33 of plastics material is shaped in the molding to define a longitudinally extending groove 110 on each side with a base 111 of the groove at the surface of the metal skate blade. The groove is formed between a bottom piece of the over-mold 33 and a top piece 112 which extends across on top of the blade over the top edge 40. The top piece 112 and the remainder of the over-molding 33 are integrated at the end 46A of the raised portion 46 of the blade opposite the board 9 as indicated at 113 where the wire loops around the end 46A of the portion 46 cross the over-molding 33.

The groove has a width equal roughly to the diameter of the wire and the resistance heating member in the form of the wire is received in the groove at the base 111 in contact with the respective side surface of the blade.

The resistance heating member in the form of the wire 101 is compressed into the groove against the surface of the blade at the base by a deformable bead 115 of a resilient plastics material. The deformable bead 115 of resilient material is compressed by insertion of the over-molding into the slot 16 of the support 15 so that the sides 28 and 29 of the slot apply pressure against an outwardly projecting portion of the bead to apply pressure on the deformable bead. In this way the resistance heating member in the form of the wire is compressed against the surface of the skate blade member at the base of the groove by the deformable bead, which is formed of a heat insulating resilient material of a hardness of for example 73 Shore A.

In this way, the resistance heating wire has one side in contact with the skate blade member and all other sides surrounded by heat insulating plastics material defined by the over-molding 33 and the bead 115. A thermally conductive adhesive is located on the side of the heating wire at the blade to improve contact and heat transfer.

As an alternative to the provision of two wire portions along the side surfaces of the blade, there may be provided only a single wire in a single groove with that groove located at one side or on top of the blade The battery power supply 14 includes a battery 71 and the battery control circuit board 14A located underneath the battery and including a conventional battery protection circuit which is part of the battery since the batteries are sold with this little circuit incorporated in the battery enclosure. The battery control circuit 14A carries the components for controlling the supply of power from the battery including a low power indicator. The battery 71 and the circuit board 14A are contained within an encapsulating material 116 to form an enclosed separate item which can be inserted into the hollow tower as an integral element to be contained therein. The encapsulated battery power supply includes a pair of terminals 74 one of which can be seen in FIG. 15 which extend downwardly from the battery side by side as spring wire contacts and which are arranged to be connected to the board 9 for communication of current from the battery power supply to the heat control circuit 9 carried on the blade.

As previously described, the blade itself can be removed from the mounting and thus the terminals 74 may comprise spring-finger type wires or fingers which engage onto fixed terminals on the circuit 9. Thus simple upward pressure of the board 9 onto the spring fingers 74 as the skate blade member is inserted into the support at the required location causes the engagement between the terminals 74 and the requisite terminal on the circuit 9. Alternatively conventional wires and clip type terminals can be used. The battery power supply further includes a further terminal 76 in the form of a spring finger which extends from one end of the battery control circuit board for engagement with a stud or rivet 77 carried in the tower as best shown in FIG. 12 where the stud has a head 78 exposed at the rear wall 23 of the tower for engaging a charging system.

A charging system for the skate can therefore comprise components which have a first terminal for engagement with the blade 32 and a second terminal for engagement with the head 78 of the stud 77. This provides a connection to the battery power supply through the battery control circuit 14A.

In another arrangement, the battery and control board can be removable from the tower and charged in a separate charger unit, which can be a team charger containing a series of such battery packs or can be a single unit charger. In this arrangement the stud 77 is omitted and becomes the location of the LED indicating operation of the unit.

The circuit board 9 is thus contained within the slot 16 above the shoulders 37 and 38 and is encapsulated in this area by a suitable low pressure molding material which engages over the board 9 on top of the high pressure structural overmolding 33. The board 9 is also contained within the tower 4 of the support so that it is fully enclosed both by its own encapsulation and by the surrounding structure of the support.

The battery power supply 14 is contained within the rear tower 4 above the elongate member 15 of the support and within the enclosed tower 4. The flange 6A is sealed to the underside of the skate boot with the battery power supply 14 in place. The sealing action can be provided by a gasket which overlies the flange 6A to provide an effective sealing action to prevent the penetration of moisture from the ice or from the environment into the rear tower 4 and thus into the area of the battery power supply. The rear tower 4 is fully enclosed and sealed without any openings for switches or connections since the tapered shoulder 33 seals with the base of the bottom support 15 when the screw 64 is tightened, apart from the stud 77 which is itself sealed into a hole in the rear wall 23 of the tower 4.

In order to avoid unnecessary openings into the hollow rear tower 4, the manually operable switch arrangement for activating the power supply is defined by a pair of proximity switches 79 and 80 mounted on a flexible circuit board 83 the inside surface of the hollow rear tower 4 at sides of the tower at a position where the fingers and thumb of a user can reach around the rear wall 23 to squeeze together on respective side of the hollow rear tower to engage the areas of the tower at the proximity switches 79 and 80. The use of two proximity switches one on each side prevents inadvertent operation of the switch actuating the power supply by contact with an extraneous item such as a puck or other elements such as an opponent's stick. Thus the actuation of the switch occurs only in the event that both proximity switches are activated simultaneously and are touched for a required period of time. Thus the microprocessor may be programmed that the sensors must be touched for a predetermined minimum period of time or in a pattern like a computer mouse double click, that is they may be touched for at least predetermined minimum period of time but not more than a predetermined maximum period of time then released for at least predetermined minimum period of time but not more than a predetermined maximum period of time and then touched for at least a predetermined period of time which is an extremely unlikely event unless controlled by the user reaching to the proximity switches by a finger and thumb.

The use of the proximity switches avoids the penetration of the tower 4 so that there is no possibility for moisture penetration through openings at the switches. Proximity switches are commonly available and utilize the electrical changes effected by bringing the finger or thumb into close proximity with the electrical component on the inside surface.

An indicator light or LED for indicating the activation of the power supply is visible on the exterior of the tower 4 and is provided at the location 81 visible on both sides of the blade indicated on FIG. 2. The LED itself is shown in FIG. 12 as indicated at 82. At this location the plastics material forming the moulded skate support is made sufficiently thin that the illumination from the LED is visible on both sides through the plastics material without the necessity for a penetration of the LED itself through the plastics material. In the arrangement shown the LED is located at a position just above the top edge of the blade 32 in the area just above the elongate support 15 and just behind the central heated area of the skate blade. The LED may itself be located within the tower on one or other side adjacent the proximity switches 79 and 80 or on the rear. The LED may be controlled by the circuit to indicate battery depletion below a predetermined level, for example by changing color.

The arrangement described above provides a number of advantages as follows:

The heating wire has both its ends protected against moisture by the over-molding low pressure encapsulating plastic material covering the board 9. The wire is continuous and unbroken in its loop from the ends.

The heating element, in the form of the wire or other resistance heating element is compressed against the steel blade with the extrusion or bead compressed between it and the holder.

The battery 14 and electronics 14A are protected against moisture with plastic over-moulding. As an alternative to the over-molding using low pressure molded plastics material it is also possible to use conventional potting materials.

The two proximity sensors are used to actuate the power to avoid inadvertent action. They have a pattern so that the player must hold his fingers there for a given amount of time (minimum X seconds, maximum Y seconds) so that it eliminates turning on or off accidentally.

The connections provided can use the steel blade and a rivet to transfer the electricity from a charger to charge the battery.

The spring loaded contacts 74 or the terminal type connectors act to transfer the electricity from the battery pack to the heating device but can be readily separate when required. This allows the blade to be easily changed when it has been sharpened too many times.

The spring loaded contact 77 acts to transfer the electricity from the battery to the rivet.

The mechanical features of the slotted holes 7A in the flanges, the tapered joint 16 between over-molded steel blade and the support or holder and the anti-vibration ribs 33C on the over-molded steel blade provide an effective mounting of the blade on the boot.

The invention claimed is:

1. A combination of a skate blade member and support therefor for attachment to a skate boot, comprising:

a skate blade member;

a support for the skate blade member having a bottom slot member defining a downwardly facing slot for receiving the blade member in fixed position along the slot, a front tower member and a rear tower member each extending upwardly from the bottom slot member to a top portion for attachment to the skate boot;

wherein the blade member comprises a rigid metal blade and an over-molding of a plastics material molded onto sides of the blade so that the plastics over-molding material is attached to the blade with a bottom edge of the blade exposed below the over-molding material;

the over-molding material being wider than the blade so as to have side surfaces adjacent an upper edge of the blade each side surface projecting outwardly from a respective side of the blade;

the blade member being separate from and removable from the slot;

the over-molding material being molded to form a shape in transverse cross-section for engaging into the slot such that said side surfaces of the over-molding material engage sides of the slot to hold the blade member in place against side to side movement;

wherein said side surfaces of the over-molding material are tapered and engage into tapered sides in the slot;

wherein the over-molding material is shaped with shoulder members on each side each projecting outwardly from a respective one of said side surfaces for engaging a respective shoulder on the slot member on a respective side of the slot;

wherein the rigid metal blade includes a metal wedge member which projects through the over-molding material to a position above the over-molding material for engaging the support;

and a tightening arrangement for applying a pulling force on the blade member longitudinally along the slot member;

wherein the support includes an inclined receptacle for the wedge member with the inclined receptacle and the wedging member having cooperating inclined surfaces acting in a wedging action in response to the longitudinal pulling force to pull the tapered side surfaces of the over-molding material of the blade member in a direction into the slot of the slot member;

the inclined receptacle and the wedging member being arranged in position relative to the slot and said side surfaces of the over-molding material such that the wedging action causes said side surfaces to be in engagement with said slot before the wedging member reaches a bottom of the receptacle.

2. The combination according to claim 1 wherein the blade has hook elements at spaced positions along its length which are molded into the over-molding material to prevent the blade from being pulled downwardly out of the over-molding material.

3. The combination according to claim 1 wherein the wedge member is arranged adjacent the front of the blade member and the tightening arrangement is arranged to effect a pulling action rearwardly.

4. The combination according to claim 1 wherein the tightening arrangement comprises a captured nut on the blade member and a screw on the support.

5. The combination according to claim 4 wherein the captured nut is mounted for pivotal movement about a transverse axis.

6. The combination according to claim 1 wherein the tightening arrangement comprises a screw fastener extending through a hole from the slot member to a rear of the rear tower member.

7. The combination according to claim 1 wherein the over-molding material has sides which engage into the slot which are castellated in a direction facing away from sides of the blade.

8. The combination according to claim 7 wherein the blade has a bottom edge which curves upwardly at a front of the blade to define an upwardly curved front section and wherein the castellated sides are arranged at the upwardly curved front section.

9. The combination according to claim 1 wherein each tower has a top edge flange with fastening holes for receiving fastening screws for fastening to the bottom surface of a skate boot and wherein holes are elongate to allow adjustment of the tower on the boot.

* * * * *